United States Patent
Miyashita

(10) Patent No.: US 7,377,273 B2
(45) Date of Patent: May 27, 2008

(54) AIR-FUEL RATIO CONTROL APPARATUS FOR INTERNAL COMBUSTION ENGINE

(75) Inventor: Shigeki Miyashita, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/629,628

(22) PCT Filed: May 11, 2006

(86) PCT No.: PCT/JP2006/309889

§ 371 (c)(1),
(2), (4) Date: Dec. 15, 2006

(87) PCT Pub. No.: WO2006/129483

PCT Pub. Date: Dec. 7, 2006

(65) Prior Publication Data

US 2008/0011282 A1     Jan. 17, 2008

(30) Foreign Application Priority Data

May 31, 2005   (JP)   ............................. 2005-159778

(51) Int. Cl.
    *F02D 41/00*   (2006.01)
    *F01N 3/10*    (2006.01)
    *F01L 1/34*    (2006.01)

(52) U.S. Cl. ................... 123/672; 123/691; 123/90.15; 60/285

(58) Field of Classification Search ................ 123/443, 123/672, 691, 692, 90.11, 90.15, 568.11, 123/568.14; 60/274, 276, 285–286
See application file for complete search history.

(56) References Cited

U.S. PATENT DOCUMENTS

| | | | |
|---|---|---|---|
| 5,758,493 A * | 6/1998 | Asik et al. ..................... | 60/274 |
| 6,318,075 B1 | 11/2001 | Günther et al. | |
| 6,516,612 B1 * | 2/2003 | Yokoi et al. ................... | 60/301 |
| 6,804,953 B2 * | 10/2004 | Kondo ......................... | 60/285 |
| 6,951,098 B2 * | 10/2005 | Xu et al. ...................... | 60/286 |
| 7,195,001 B1 * | 3/2007 | Pallett ......................... | 123/443 |
| 7,311,079 B2 * | 12/2007 | Surnilla et al. .............. | 123/325 |
| 2002/0038541 A1 | 4/2002 | Sumilla et al. | |

(Continued)

FOREIGN PATENT DOCUMENTS

DE    103 26 889    12/2004

(Continued)

*Primary Examiner*—Hai Huynh
(74) *Attorney, Agent, or Firm*—Oblon, Spivak, McClelland, Maier & Neustadt, P.C.

(57) ABSTRACT

A common fuel injection amount is calculated for the cylinders of a first cylinder group, which performs a rich burn process, and the cylinders of a second cylinder group, which performs a lean burn process. The calculated fuel injection amount is corrected with an air-fuel ratio learning value that is acquired beforehand during a stoichiometric operation. Intake valve lift amounts for the cylinders of the first and second cylinder groups are calculated in accordance with an engine speed and engine load. In compliance with the calculated values, a variable valve mechanism is driven, and fuel is ignited. When performing sulfur poisoning recovery of the Ox catalyst, the exhaust air fuel ratio control means change the intake air amount for each cylinder while providing substantially the same fuel injection amount for all cylinders.

10 Claims, 5 Drawing Sheets

U.S. PATENT DOCUMENTS

2004/0040287 A1   3/2004   Beutel et al.

FOREIGN PATENT DOCUMENTS

| | | |
|---|---|---|
| EP | 1 306 531 | 5/2003 |
| JP | 2000 352310 | 12/2000 |
| JP | 2001 329872 | 11/2001 |
| JP | 2003 97259 | 4/2003 |

* cited by examiner

AIR-FUEL RATIO CONTROL APPARATUS FOR INTERNAL COMBUSTION ENGINE

TECHNICAL FIELD

The present invention relates to an air-fuel ratio control apparatus for an internal combustion engine that is capable of performing a rich burn process or a lean burn process for each cylinder group.

BACKGROUND ART

A known method for providing each cylinder group with a rich or lean air-fuel ratio is used to perform sulfur poisoning recovery of a NOx catalyst. A known device (as disclosed, for example, in the following Patent Document 1) varies the fuel injection amount for each cylinder group in order to provide each cylinder group with a rich or lean air-fuel ratio. Another known device (as disclosed, for example, by the following Patent Document 2) varies the fuel injection amount and intake air amount for each cylinder group in order to provide each cylinder group with a rich or lean air-fuel ratio.

[Patent Document 1]
Japanese Patent Laid-Open No. 2003-97259
[Patent Document 2]
Japanese Patent Laid-Open No. 2001-329872
[Patent Document 3]
Japanese Patent Laid-Open No. 2000-352310

DISCLOSURE OF THE INVENTION

If the exhaust air-fuel ratio prevailing downstream of the NOx catalyst is rich when sulfur poisoning recovery for the NOx catalyst is performed, the amount of exhaust emission including unburned HC increases. To reduce the emission exhaust amount at the time of sulfur poisoning recovery, there is a desirable control that the exhaust air-fuel ratio prevailing downstream of the NOx catalyst is equal to a theoretical air-fuel ratio (stoichiometric ratio). To accurately control the exhaust air-fuel ratio prevailing downstream of the NOx catalyst, it is preferred that an air-fuel ratio learning value, which is derived from air-fuel ratio control performed during a normal stoichiometric operation, be used. The air-fuel ratio learning value is a correction value that corrects, for instance, the fuel injection amount in consideration of air flow meter variations, fuel injection valve variations, and the like.

However, when a normal stoichiometric operation is performed, the fuel injection amount is not greatly varied for each cylinder group as described in Patent Documents 1 and 2. Therefore, the air-fuel ratio learning value prevailing when the fuel injection amount is greatly varied for each cylinder group is not obtained. Consequently, the above air-fuel ratio learning value cannot be used for exhaust air-fuel ratio control when sulfur poisoning recovery for the NOx catalyst is performed. As a result, it is practically impossible to enhance the controllability of the exhaust air-fuel ratio prevailing downstream of the NOx catalyst and sufficiently restrain the emission exhaust amount.

The present invention has been made to solve the above problem. It is an object of the present invention to sufficiently restrain the emission exhaust amount by enhancing the controllability of the exhaust air-fuel ratio prevailing downstream of the NOx catalyst when sulfur poisoning recovery for the NOx catalyst is performed.

The above object is achieved by an air-fuel ratio control apparatus for an internal combustion engine according to a first aspect of the present invention. The apparatus comprises a first exhaust path connected to a first cylinder group and a second exhaust path connected to a second cylinder group. The apparatus also comprises a NOx catalyst positioned downstream of a confluence of the first exhaust path and the second exhaust path. The apparatus also comprises a fuel injection valve for injecting fuel into each of cylinders of the first and second cylinder groups. The apparatus also comprises an intake air amount adjustment mechanism for changing an intake air amount for each of the cylinders. The apparatus also comprises poisoning recovery means for performing sulfur poisoning recovery of the NOx catalyst by causing the first cylinder group to perform a rich burn or lean burn process and causing the second cylinder group to perform a lean burn or rich burn process. The apparatus also comprises exhaust air-fuel ratio control means for changing the intake air amount for each cylinder by operating the intake air amount adjustment mechanism at the time of performing the sulfur poisoning recovery while providing substantially the same fuel injection amount for all cylinders of the first and second cylinder groups.

The above object is also achieved by an air-fuel ratio control apparatus for an internal combustion engine according to a second aspect of the present invention. The apparatus comprises a first exhaust path connected to a first cylinder group and a second exhaust path connected to a second cylinder group. The apparatus also comprises a NOx catalyst positioned downstream of a confluence of the first exhaust path and the second exhaust path. The apparatus also comprises a fuel injection valve for injecting fuel into each of cylinders of the first and second cylinder groups. The apparatus also comprises a variable valve mechanism that changes the intake air amount for each of the cylinders by changing a valve opening characteristic of an intake valve possessed by each of the cylinders. The apparatus also comprises poisoning recovery means for performing sulfur poisoning recovery of the NOx by causing the first cylinder group to perform a rich burn or lean burn process and causing the second cylinder group to perform a lean burn or rich burn process. The apparatus also comprises exhaust air-fuel ratio control means for changing the intake air amount for each cylinder by operating the variable valve mechanism at the time of performing the sulfur poisoning recovery while providing substantially the same fuel injection amount for all cylinders of the first and second cylinder groups.

From the foregoing, according to the first or second aspect of the present invention, when sulfur poisoning recovery is performed, it is possible to provide substantially the same fuel injection amount for all cylinders in the first and second cylinder groups. Therefore, the air-fuel ratio learning value acquired during a stoichiometric operation can be used when the exhaust air-fuel control means executes air-fuel ratio control. This makes it possible to enhance the controllability of the exhaust air-fuel ratio prevailing at the time of sulfur poisoning recovery and sufficiently restrain the emission exhaust amount.

According to a third aspect of the present invention, the apparatus according to the first or second aspect of the present invention may further comprise ignition timing control means. When the sulfur poisoning recovery is performed, the ignition timing control means gives ignition timing for optimizing torque and fuel consumption to a cylinder group that performs a rich burn process, and gives ignition timing that is retarded from the ignition timing for optimizing torque and fuel consumption to a cylinder group that performs a lean burn process.

The third aspect of the present invention gives ignition timing for optimizing torque and fuel consumption to a cylinder group that performs a rich burn process, and gives ignition timing that is retarded from the ignition timing for optimizing torque and fuel consumption to a cylinder group that performs a lean burn process. This makes it possible to reduce the torque of the cylinder group that performs a lean burn process, thereby restraining torque variations among cylinders.

According to a fourth aspect of the present invention, the apparatus according to any one of the first to third aspects of the present invention may further comprise exhaust air-fuel ratio acquisition means for acquiring an exhaust air-fuel ratio that prevails downstream of the confluence of the first exhaust path and the second exhaust path. If the exhaust air-fuel ratio acquired by the exhaust air-fuel ratio acquisition means does not agree with a theoretical air-fuel ratio when the sulfur poisoning recovery is performed, the exhaust air-fuel ratio control means additionally changes the intake air amount for each cylinder.

Even if the exhaust air-fuel ratio acquired by the exhaust air-fuel ratio acquisition means does not agree with the theoretical air-fuel ratio due, for instance, to dimensional variations of the intake air amount adjustment mechanism (e.g., throttle valve) or variable valve mechanism, the fourth aspect of the present invention can accurately control the exhaust air-fuel ratio by allowing the variable valve mechanism to additionally change the intake air amount.

According to a fifth aspect of the present invention, the apparatus according to any one of the first to fourth aspects of the present invention may further comprise an exhaust sensor positioned downstream of the NOx catalyst and for detecting an exhaust air-fuel ratio. If the exhaust air-fuel ratio detected by the exhaust sensor does not agree with a theoretical air-fuel ratio when the sulfur poisoning recovery is performed, the exhaust air-fuel ratio control means additionally changes the intake air amount for each cylinder.

Even if the exhaust air-fuel ratio detected by the exhaust sensor does not agree with the theoretical air-fuel ratio due, for instance, to dimensional variations of the intake air amount adjustment mechanism (e.g., throttle valve) or variable valve mechanism, the fifth aspect of the present invention can accurately control the exhaust air-fuel ratio by allowing the variable valve mechanism to additionally change the intake air amount.

BEST MODE FOR CARRYING OUT THE INVENTION

Figure 1:
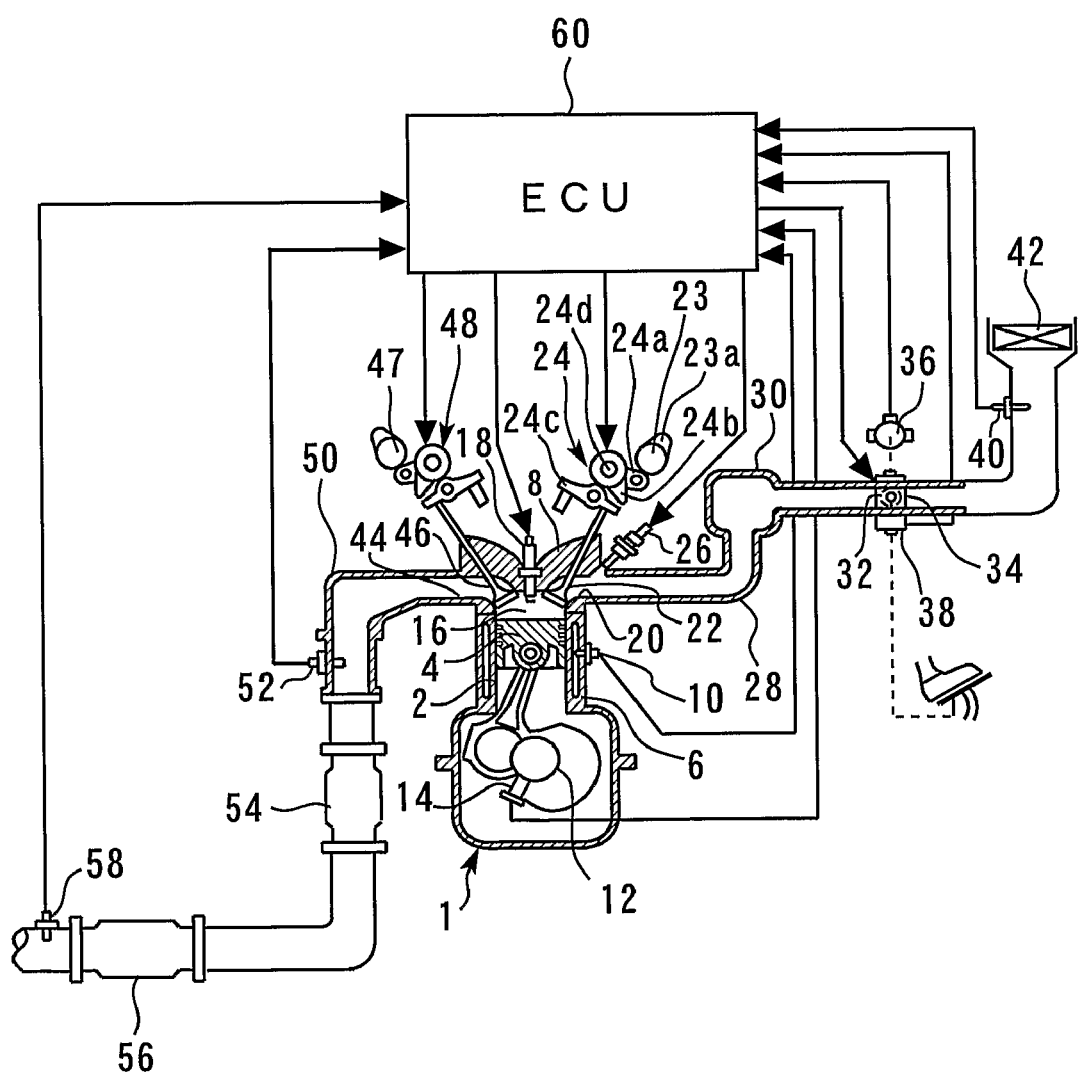
FIG. 1 is a schematic diagram illustrating the configuration of a system according to a first embodiment of the present invention.

Embodiments of the present invention will now be described with reference to the accompanying drawings. Like elements in the drawings are designated by like reference numerals and will not be described repeatedly.

First Embodiment

[Description of System Configuration]

Figure 2:
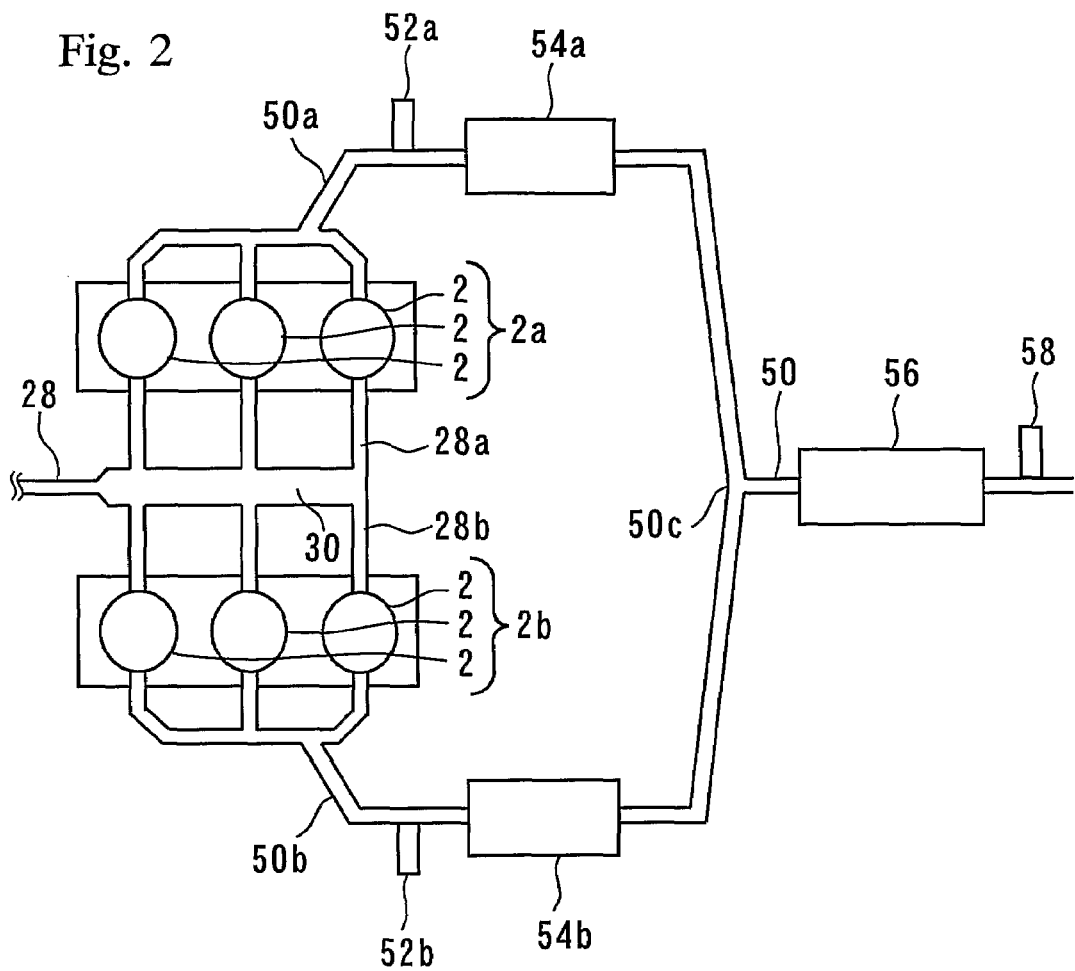
FIG. 2 is a schematic diagram illustrating cylinder groups in the system shown in FIG. 1.

FIG. 1 is a schematic diagram illustrating the configuration of a system according to a first embodiment of the present invention. FIG. 2 is a schematic diagram illustrating cylinder groups in the system shown in FIG. 1. As shown in FIG. 1, the system according to the first embodiment includes an internal combustion engine 1. The internal combustion engine 1 has a plurality of cylinders 2. FIG. 1 shows only one of the plurality of cylinders 2. As indicated in FIG. 2, the plurality of cylinders 2 are divided into a first cylinder group 2a and a second cylinder group 2b.

The internal combustion engine 1 includes a cylinder block 6, which contains a piston 4. The piston 4 is connected to a crankshaft 12 via a crank mechanism. A crank angle sensor 14 is positioned near the crankshaft 12. The crank angle sensor 14 detects the rotary angle of the crankshaft 12. The cylinder block 6 includes a water temperature sensor 10. The water temperature sensor 10 detects the temperature of cooling water that circulates in the internal combustion engine 1.

A cylinder head 8 is mounted on the top of the cylinder block 6. The space between the cylinder head 8 and the upper surface of the piston 4 constitutes a combustion chamber 16. The cylinder head 8 includes an ignition plug 18 that ignites an air-fuel mixture in the combustion chamber 16.

The cylinder head 8 includes an intake port 20 that communicates with the combustion chamber 16. The joint between the intake port 20 and combustion chamber 16 is provided with an intake valve 22. A variable valve mechanism 24 is positioned between the intake valve 22 and an intake camshaft 23. The intake camshaft 23 is coupled to the crankshaft 12 via a coupling mechanism (not shown).

The variable valve mechanism 24 is configured so as to change the operation characteristics (operating angle and lift amount) of the intake valve 22. More specifically, the variable valve mechanism 24 includes an input arm 24a, which is pushed by an intake cam 23a on the intake camshaft 23. The variable valve mechanism 24 also includes an output arm 24b, which pushes a rocker arm 24c. Further, the variable valve mechanism 24 includes a control shaft 24d. The control shaft 24d can move in axial direction (in the front-rear direction in FIG. 1). When the control shaft 24d moves, the phase difference between the input arm 24a and output arm 24b varies. This makes it possible to change the operating angle and lift amount of the intake valve 22. As a result, the amount of air to be taken into the combustion chamber 16 can be changed.

The intake port 20 is connected to an intake path 28. An injector (also called "fuel injection valve") 26 is positioned near the intake port 20. The injector 26 injects fuel to an area near the intake port 20. A surge tank 30 is positioned in the middle of the intake path 28. As shown in FIG. 2, a first intake path 28a, which is connected to the cylinders 2 of the first cylinder group 2a, and a second intake path 28b, which is connected to the cylinders 2 of the second cylinder group 2b, communicate with the common surge tank 30.

A throttle valve 32 is positioned upstream of the surge tank 30. The throttle valve 32 is an electronically controlled valve that is driven by a throttle motor 34. The throttle valve 32 is driven in accordance with an accelerator opening AA, which is detected by an accelerator opening sensor 38. A throttle opening sensor 36 is positioned near the throttle valve 32. The throttle opening sensor 36 detects a throttle opening TA. An air flow meter 40 is positioned upstream of the throttle valve 32. The air flow meter 40 detects an intake air amount Ga. An air cleaner 42 is positioned upstream of the air flow meter 40.

The cylinder head 8 also includes an exhaust port 44, which communicates with the combustion chamber 16. The joint between the exhaust port 44 and combustion chamber 16 is provided with an exhaust valve 46. A variable valve mechanism 48 is positioned between the exhaust valve 46 and an exhaust camshaft 47. The exhaust camshaft 47 is coupled to the crankshaft 12 via a coupling mechanism (not shown). As is the case with the aforementioned variable valve mechanism 24, the variable valve mechanism 48 is configured so as to change the operation characteristics (operating angle and lift amount) of the exhaust valve 46.

The exhaust port 44 is connected to an exhaust path 50. The exhaust path 50 is provided with a startup catalyst 54. The startup catalyst 54 is positioned adjacent to the internal combustion engine 1. A NOx catalyst 56 is positioned downstream of the startup catalyst 54. The startup catalyst 54 is, for instance, a three-way catalyst. At engine startup, the startup catalyst 54 becomes active earlier than the NOx catalyst 56. The NOx catalyst 56 occludes or discharges NOx in an exhaust gas.

An air-fuel ratio sensor 52 is positioned upstream of the startup catalysts 54. Another air-fuel ratio sensor 58 is positioned downstream of the NOx catalyst 56. These air-fuel ratio sensors 52, 58 detect the exhaust air-fuel ratios prevailing at their respective positions.

As shown in FIG. 2, a first exhaust path 50a is connected to the first cylinder group 2a. A first startup catalyst 54a is positioned in the first exhaust path 50a. A first air-fuel ratio sensor 52a is positioned immediately before the first startup catalyst 54a. Similarly, a second exhaust path 50b is connected to the second cylinder group 2b. A second startup catalyst 54b is positioned in the second exhaust path 50b. A second air-fuel ratio sensor 52b is positioned immediately before the second startup catalyst 54b. The aforementioned NOx catalyst 56 and air-fuel ratio sensor 58 are positioned downstream of a confluence 50c of the first exhaust path 50a and second exhaust path 50b.

The system according to the present embodiment also includes an ECU (Electronic Control Unit) 60, which serves as a controller. The output end of the ECU 60 is connected, for instance, to the ignition plug 18, variable valve mechanisms 24, 48, injector 26, and throttle motor 34. The input end of the ECU 60 is connected, for instance, to the water temperature sensor 10, crank angle sensor 14, throttle opening sensor 36, accelerator opening sensor 38, air flow meter 40, air-fuel ratio sensors 52 (52a, 52b), and air-fuel ratio sensor 58. In accordance with outputs that are generated by the sensors, the ECU 60 executes control over the entire internal combustion engine, including fuel injection control and ignition timing control.

The ECU 60 also calculates an engine speed NE in accordance with the output of the crank angle sensor 14.

Further, the ECU 60 calculates an engine load KL in accordance, for instance, with the accelerator opening AA, which is detected by the accelerator opening sensor 38.

Furthermore, the ECU 60 controls valve operation characteristics (operating angle and lift amount) by exercising drive control over the variable valve mechanisms 24, 48.

Moreover, the ECU 60 executes air-fuel ratio feedback control during a normal stoichiometric operation. The ECU 60 stores the relationship between the engine load KL and the air-fuel ratio learning value derived from feedback control (as described in detail later).

Features of the First Embodiment

The NOx catalyst 56 in the system described above occludes or discharges NOx and occludes the sulfur content of an exhaust gas. When the amount of sulfur content occlusion increases, the performance of the NOx catalyst 56 (that is, the NOx occlusion capacity) decreases. It is therefore necessary to perform sulfur poisoning recovery of the NOx catalyst 56 at predetermined time intervals or whenever a predetermined distance has been traveled. When sulfur poisoning recovery is to be performed for the NOx catalyst 56, the catalyst bed temperature of the NOx catalyst 56 needs to be high.

As such being the case, the system performs a rich burn or lean burn process for each of the cylinder groups 2a, 2b. The subsequent description assumes that a rich burn process is performed for the first cylinder group 2a while a lean burn process is performed for the second cylinder group 2b. When the rich burn and lean burn processes are performed as mentioned above, the rich exhaust gas discharged from the first cylinder group 2a and the lean exhaust gas discharged from the second cylinder group 2b flow into the NOx catalyst 56. Unburned HC and CO then burn (oxidize) in the NOx catalyst 56 so that the NOx catalyst bed temperature rises.

To perform sulfur poisoning recovery of the NOx catalyst 56 with the highest efficiency, it is preferred that the exhaust air-fuel ratio prevailing downstream of the NOx catalyst 56 be rich. However, if the exhaust air-fuel ratio prevailing downstream of the NOx catalyst 56 is rich at the time of sulfur poisoning recovery of the NOx catalyst 56, the exhaust amount of unburned HC, CO, and other emission increases.

Under the above circumstances, the first embodiment executes control so as to equalize the exhaust air-fuel ratio prevailing downstream of the NOx catalyst with the theoretical air-fuel ratio (stoichiometric ratio) for the purpose of sufficiently restraining the emission exhaust amount at the time of sulfur poisoning recovery of the NOx catalyst 56. To improve the controllability of the exhaust air-fuel ratio prevailing downstream of the NOx catalyst 56, it is ideal that the air-fuel ratio learning value acquired during a normal stoichiometric operation be used.

The air-fuel ratio learning value will now be described briefly.

Figure 3:
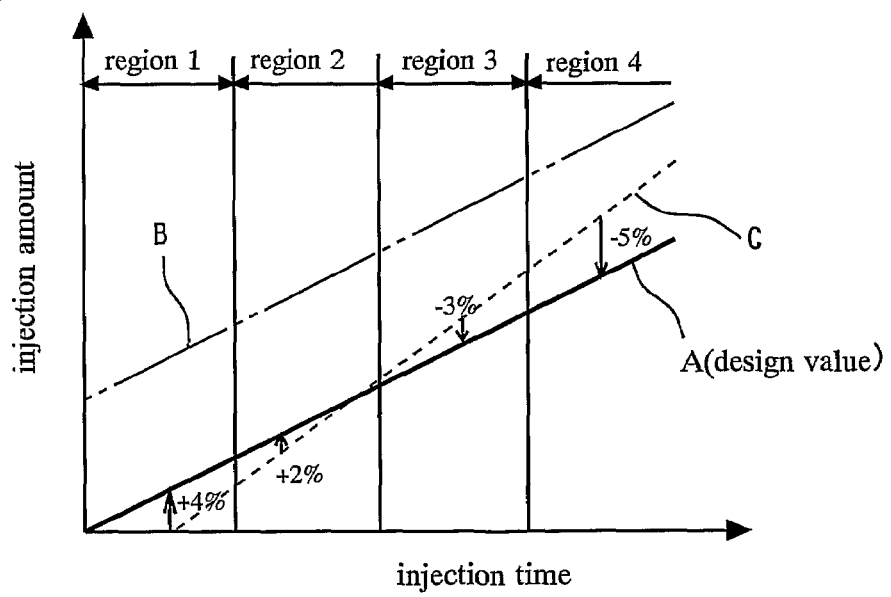
FIG. 3 is a diagram for illustrating the air-fuel ratio learning value.

When a normal stoichiometric operation is performed, the system described above executes air-fuel ratio feedback control so as to obtain a stoichiometric air-fuel ratio. In this feedback control, the fuel injection amount or the like is corrected to absorb an air flow meter variation and fuel injection valve variation. The corrected value of the fuel injection amount or the like is referred to as the air-fuel ratio learning value. The term "variation" denotes a deviation between a design value and the actual characteristic of the air flow meter 40 or fuel injection valve (injector) 26. FIG. 3 is a diagram for illustrating the air-fuel ratio learning value.

In FIG. 3, the symbol A represents a fuel injection valve design value. As regard the design value, the injection amount is proportional to the injection time. In reality, however, the characteristic indicated by the symbol B or C prevails. It means that there is a deviation between the actual characteristic and design value. This deviation affects the aforementioned exhaust air-fuel ratio. If the actual characteristic is as indicated by the symbol B, the zero point should be minus-corrected. If, on the other hand, the actual characteristic is as indicated by the symbol C, the required correction cannot be made at one point only. When the characteristic indicated by the symbol C prevails, the injection time (that is, the engine load) is divided into a plurality of regions 1-4, and a correction value (%) is determined for each region. For example, determined correction values (air-fuel ratio learning values) are +4% for region 1, +2% for region 2, −3% for region 3, and −5% for region 4.

As described earlier, when sulfur poisoning recovery is to be performed, a conventional apparatus performs a rich burn or lean burn process for each cylinder group by applying different fuel injection amounts to various cylinder groups. In this instance, region 4 may be applied, for example, to a cylinder group that performs a rich burn process, and region 2 may be applied to a cylinder group that performs a lean burn process. However, the aforementioned air-fuel ratio learning values are determined on the assumption that substantially the same fuel injection amounts are applied to all cylinders. Therefore, if sulfur poisoning recovery is to be performed in the above-mentioned conventional apparatus, the air-fuel ratio learning values cannot be used. Consequently, it is practically impossible to enhance the controllability of the exhaust air-fuel ratio at the time of sulfur poisoning recovery and sufficiently restrain the emission exhaust amount.

Under the above circumstances, the first embodiment makes it possible to use the above air-fuel ratio learning values by applying the same fuel injection amount to the cylinders 2 of the first and second cylinder groups 2a, 2b at the time of sulfur poisoning recovery. In other words, the fuel injection amount can be corrected in consideration of the variations of the air flow meter 40 and fuel injection valve 26.

Further, in the first embodiment, the intake air amount for the first cylinder group 2a and the intake air amount for the second cylinder group 2b are rendered different from each other by the variable valve mechanism 24 without significantly changing the air passage amount of the air flow meter 40. In other words, the intake air amounts for various cylinders are rendered different from each other by operating the variable valve mechanism 24 to change the lift amount of the intake valve 22. This ensures that a rich burn process (e.g., at an air-fuel ratio of 14.2) is performed in the cylinders 2 of the first cylinder group 2a, and that a lean burn process (e.g., at an air-fuel ratio of 15.0) is performed in the cylinders of the second cylinder group 2b.

Consequently, the first embodiment can use the air-fuel ratio learning values by providing the same fuel injection amount at the time of sulfur poisoning recovery. Therefore, the variations of the air flow meter 40 and fuel injection valve 26 can be absorbed. Therefore, the controllability of the exhaust air-fuel ratio for a stoichiometric point can be enhanced. As a result, the emission exhaust amount can be sufficiently restrained.

Details of the Process Performed by the First Embodiment

Figure 4:
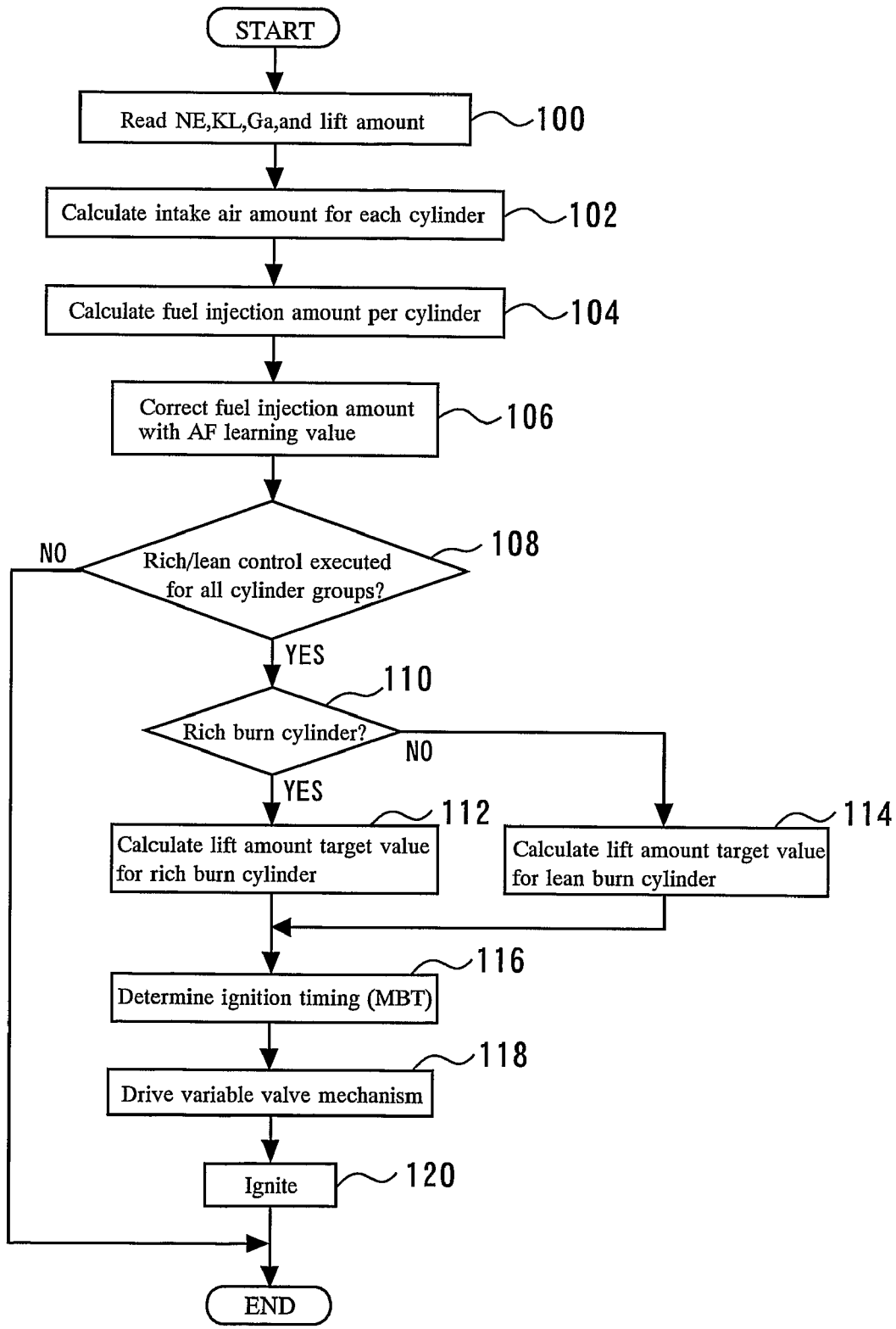
FIG. 4 is a flowchart illustrating a routine that the ECU 60 executes in accordance with the first embodiment.

FIG. 4 is a flowchart illustrating a routine that the ECU 60 executes in accordance with the first embodiment.

In the routine shown in FIG. 4, step 100 is performed first to read the engine speed NE, the engine load KL, the intake air amount Ga, and the valve lift amount of the intake valve 22. The engine speed NE can be calculated from the output of the crank angle sensor 14. The engine load KL can be calculated, for instance, from the accelerator opening AA. The intake air amount Ga can be detected by the air flow meter 40. The lift amount of the intake valve 22 can be calculated from the position of the control shaft 24b of the variable valve mechanism 24.

Next, step 102 is performed to calculate the intake air amount for each cylinder. The intake air amount for each cylinder can be calculated from the intake air amount Ga and lift amount that were read in step 100.

Next, step 104 is performed to calculate the fuel injection amount (target value) per cylinder 2. The currently executed routine applies the same fuel injection amount to all cylinders 2, and executes control so that the exhaust air-fuel ratio prevailing downstream of the NOx catalyst 56 agrees with the theoretical air-fuel ratio. Thus, the fuel injection amount for each cylinder 2 is calculated in step 104 by determining the total fuel injection amount from the intake air amount Ga read in step 100 and dividing the determined fuel injection amount by the number of cylinders 2.

Next, the fuel injection amount is corrected by multiplying the fuel injection amount calculated in step 104 by the air-fuel ratio learning value (%) (step 106). Here, when a normal stoichiometric operation is performed, the ECU 60 executes a routine other the routine described above to execute air-fuel ratio feedback control. In such feedback control, the fuel injection amount is corrected in consideration of the variations of the air flow meter 40 and fuel injection valve 26 so that the exhaust air-fuel ratio detected by the exhaust sensor 58 agrees with the target air-fuel ratio (theoretical air-fuel ratio). The ECU 60 stores the relationship between the engine load KL and the fuel injection amount correction value (%) derived from air-fuel ratio feedback control. The ECU 60 divides the engine load KL, for instance, into four regions, and stores the fuel injection amount correction value (%) for each region (see FIG. 3). The ECU 60 can read a correction amount (%) according to the engine load KL read in step 100, and use the read correction amount as the air-fuel ratio learning value in step 106.

Next, step 108 is performed to judge whether rich/lean control is executed for all cylinder groups, that is, judge whether a rich burn or lean burn process is performed for individual cylinder groups. If the judgment result obtained in step 108 does not indicate that rich/lean control is executed for all cylinder groups, the current routine terminates. In this instance, a stoichiometric burn process is performed in all the cylinders of the first and second cylinder groups 2a, 2b.

If the judgment result obtained in step 108 indicates that rich/lean control is executed for all cylinder groups, step 110 is performed to judge whether a cylinder belongs to a cylinder group that performs a rich burn process (hereinafter referred to as a "rich burn cylinder"). If the judgment result obtained in step 110 indicates that the cylinder is a rich burn cylinder, that is, the cylinder 2 belongs to the first cylinder group 2a, a map stored in the ECU 60 is referenced to calculate a lift amount target value for the rich burn cylinder (step 112). The map defines the lift amount target value with reference to the relationship between the engine speed NE and engine load KL. Further, the map is formulated so that the lift amount decreases with an increase in the engine speed NE and engine load KL. According to the map, the intake air amount for the cylinder decreases with an increase in the rotation speed and load. In other words, when an operation is conducted at a high rotation speed and at a high load, there is a great deviation between the theoretical air-fuel ratio and the target air-fuel ratio for the rich burn cylinder.

If the judgment result obtained in step 110 indicates that the cylinder belongs to a cylinder group that performs a lean burn process (hereinafter referred to as a "lean burn cylinder"), that is, the cylinder 2 belongs to the second cylinder group 2b, a map stored in the ECU 60 is referenced to calculate the lift amount target value for the lean burn cylinder (step 114). The map defines the lift amount target value with reference to the relationship between the engine speed NE and engine load KL. This map differs from the map referenced in step 112 in that the lift amount setting increases with an increase in the engine speed NE and engine load KL. According to this map, the intake air amount for the cylinder increases with an increase in the rotation speed and load. In other words, when an operation is conducted at a high rotation speed and at a high load, there is a great deviation between the theoretical air-fuel ratio and the target air-fuel ratio for the lean burn cylinder.

The first embodiment executes control so that the exhaust air-fuel ratio prevailing downstream of the NOx catalyst 56 agrees with the theoretical air-fuel ratio. Therefore, the deviation between the theoretical air-fuel ratio and the target air-fuel ratio for the rich burn cylinder is equal to the deviation between the theoretical air-fuel ratio and the target air-fuel ratio for the lean burn cylinder.

After the lift amount target value is calculated in step 112 or 114, a map stored in the ECU 60 is referenced to determine the ignition timing (step 116). The map defines the ignition timing with reference to the relationship between the fuel injection amount and lift amount (that is, the air amount). This map selects ignition timing (MBT: minimum advance for the best torque) that optimizes the cylinder output torque and fuel consumption.

Next, the variable valve mechanism 24 is driven so as to provide the lift amount calculated in step 112 or 114 (step 118). More specifically, a map stored in the ECU 60 is referenced to move the control shaft 24d so that the above-mentioned lift amount is obtained.

Next, step 120 is performed to inject fuel in accordance with the fuel injection amount calculated in step 106 and ignite the fuel with the ignition timing determined in step 116.

When the routine described above is started anew at the time of sulfur poisoning recovery of the NOx catalyst 56, the fuel injection amount is determined in steps 104 and 106, and then the lift amount of the intake valve 22 is calculated again in step 112 or 114. Subsequently, the air-fuel mixture burns in the step 120.

As described above, the routine shown in FIG. 4 provides the same fuel injection amount for all cylinders 2 and applies different lift amounts of the intake valve 22 to the individual cylinder groups 2a, 2b so that either a rich burn process or lean burn process is performed for the cylinder groups 2a, 2b. This makes it possible to raise the NOx catalyst bed temperature. Further, since the same fuel injection amount is applied to the cylinder groups 2a, 2b, the fuel injection amount can be corrected with the air-fuel ratio learning value obtained during a stoichiometric operation. This makes it possible to absorb the variations of the air flow meter 40 and fuel injection valve 26. Thus, control can be accurately executed so that the exhaust air-fuel ratio prevailing downstream of the NOx catalyst agrees with the theoretical air-fuel ratio at the time of sulfur poisoning recovery. Consequently, the emission exhaust amount can be sufficiently restrained at the time of sulfur poisoning recovery.

The system according to the first embodiment includes the variable valve mechanisms 24, 48, which change the valve opening characteristics of the intake valve 22 and exhaust valve 46. However, the system provides the same advantages as the first embodiment if it includes at least the variable valve mechanism 24 for changing the valve opening characteristic of the intake valve 22.

Further, a solenoid valve mechanism or variable valve timing mechanism may used instead of the variable valve mechanism 24 as far as it can change the valve opening characteristic of the intake valve 22. In this instance, too, the system provides the same advantages as the first embodiment because it can provide different intake air amounts to the cylinders and perform a rich burn or lean burn process for the cylinder groups.

Furthermore, the system may include a throttle valve that is provided for each cylinder group (each bank), instead of the variable valve mechanism, as a mechanism for changing the intake air amount for each cylinder group. Moreover, the system may include a throttle valve that is installed in an intake path to each cylinder as a mechanism for changing the intake air amount for each cylinder. In these instances, too, the system provides the same advantages as the first embodiment.

The foregoing description of the first embodiment assumes that the system uses a port injector 26 for fuel injection purposes. However, the system may include an in-cylinder injector that directly injects fuel into a cylinder 2. In this instance, too, the system provides the same advantages as the first embodiment.

In the first embodiment, the "exhaust air-fuel ratio control means" according to the first or second aspect of the present invention is implemented when the ECU 60 performs steps 104, 112, and 114; and the "poisoning recovery means" according to the first or second aspect of the present invention is implemented when the ECU 60 performs steps 118 and 120.

Second Embodiment

Figure 5:
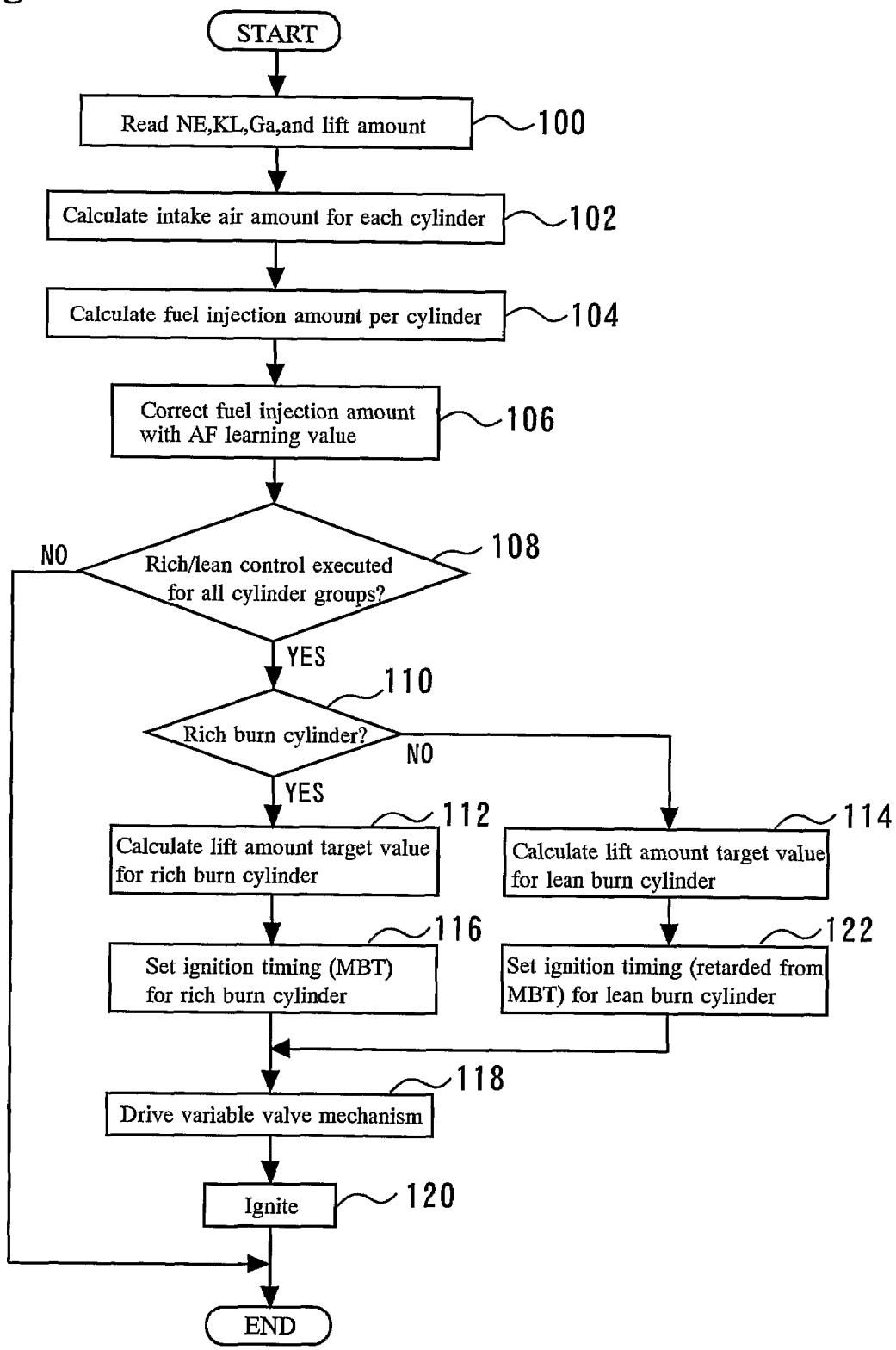
FIG. 5 is a flowchart illustrating a routine that the ECU 60 executes in accordance with the second embodiment.

The system according to a second embodiment of the present invention can be implemented by adopting the hardware configuration shown in FIGS. 1 and 2 and allowing the ECU 60 to execute a routine that is shown in FIG. 5 and will be described later.

Features of the Second Embodiment

The first embodiment, which has been described above, performs a rich burn or lean burn process for the cylinder groups 2a, 2b by providing the same fuel injection amount to all cylinders 2 and applying different intake air amounts to the individual cylinders with the variable valve mechanism 24. Further, the selected ignition timing (hereinafter referred to as the "MBT") optimizes the output torque and fuel consumption of the first and second cylinder groups 2a, 2b. If the MBT is selected as the ignition timing with the same fuel injection amount applied to all cylinders as described in conjunction with the first embodiment, the torque of a lean burn cylinder tends to be greater than that of a rich burn cylinder. The reason is that an unburned fuel loss is small because a large quantity of oxygen exists in the lean burn cylinder.

If the MBT is selected as the ignition timing in a situation where a rich burn or lean burn process is performed for each cylinder group with different fuel injection amounts applied, the torque of the rich burn cylinder is greater than that of the lean burn cylinder unlike the phenomenon encountered in the present invention.

The second embodiment selects the MBT as the ignition timing for the rich burn cylinder and gives ignition timing that is retarded from the MBT to the lean burn cylinder for the purpose of restraining cylinder-to-cylinder torque variations that may occur in the first embodiment.

Details of the Process Performed by the Second Embodiment

FIG. 5 is a flowchart illustrating a routine that the ECU 60 executes in accordance with the second embodiment.

In the routine shown in FIG. 5, the steps 100 to 110 of the routine shown in FIG. 4 are performed as is the case with the first embodiment, which has been described earlier.

If the judgment result obtained in step 110 indicates that the cylinder is a rich burn cylinder, the lift amount target value for the rich burn cylinder is calculated (step 112) as is the case with the routine shown in FIG. 4. Next, step 116 is performed to select the ignition timing (MBT) that optimizes the output torque and fuel consumption.

If, on the other hand, the judgment result obtained in step 110 indicates that the cylinder is a lean burn cylinder, the lift amount target value for the lean burn cylinder is calculated (step 114) as is the case with the routine shown in FIG. 4. Subsequently, a map stored in the ECU 60 is referenced to set the ignition timing for the lean burn cylinder (step 116). The map defines the ignition timing for the lean burn cylinder with reference to the relationship between the fuel injection amount and lift amount. According to this map, the ignition timing that is retarded from the MBT is set unlike the ignition timing for the rich burn cylinder. Further, this map is formulated so that the amount of retard from the MBT increases with an increase in the torque difference from the rich burn cylinder, that is, with an increase in the lift amount. This makes it possible to reduce the output torque of the lean burn cylinder. Consequently, the cylinder-to-cylinder torque variations can be restrained.

Next, the variable valve mechanism 24 is driven (step 118) as is the case with the routine shown in FIG. 4. Step 120 is then performed to inject fuel in accordance with the fuel injection amount calculated in step 106 and to ignite the fuel with the ignition timing determined in step 116 or 122.

As described above, the routine shown in FIG. 5 can reduce the output torque of the lean burn cylinder by retarding the ignition timing for the lean burn cylinder from the MBT. Therefore, the output torque of the lean burn cylinder can be adjusted for the output torque of the rich burn cylinder. Consequently, the second embodiment has the advantage of being capable of restraining cylinder-to-cylinder torque variations in addition to the advantages provided by the first embodiment.

In the second embodiment, the "ignition timing control means" according to the third aspect of the present invention is implemented when the ECU 60 performs step 122.

Third Embodiment

Figure 6:
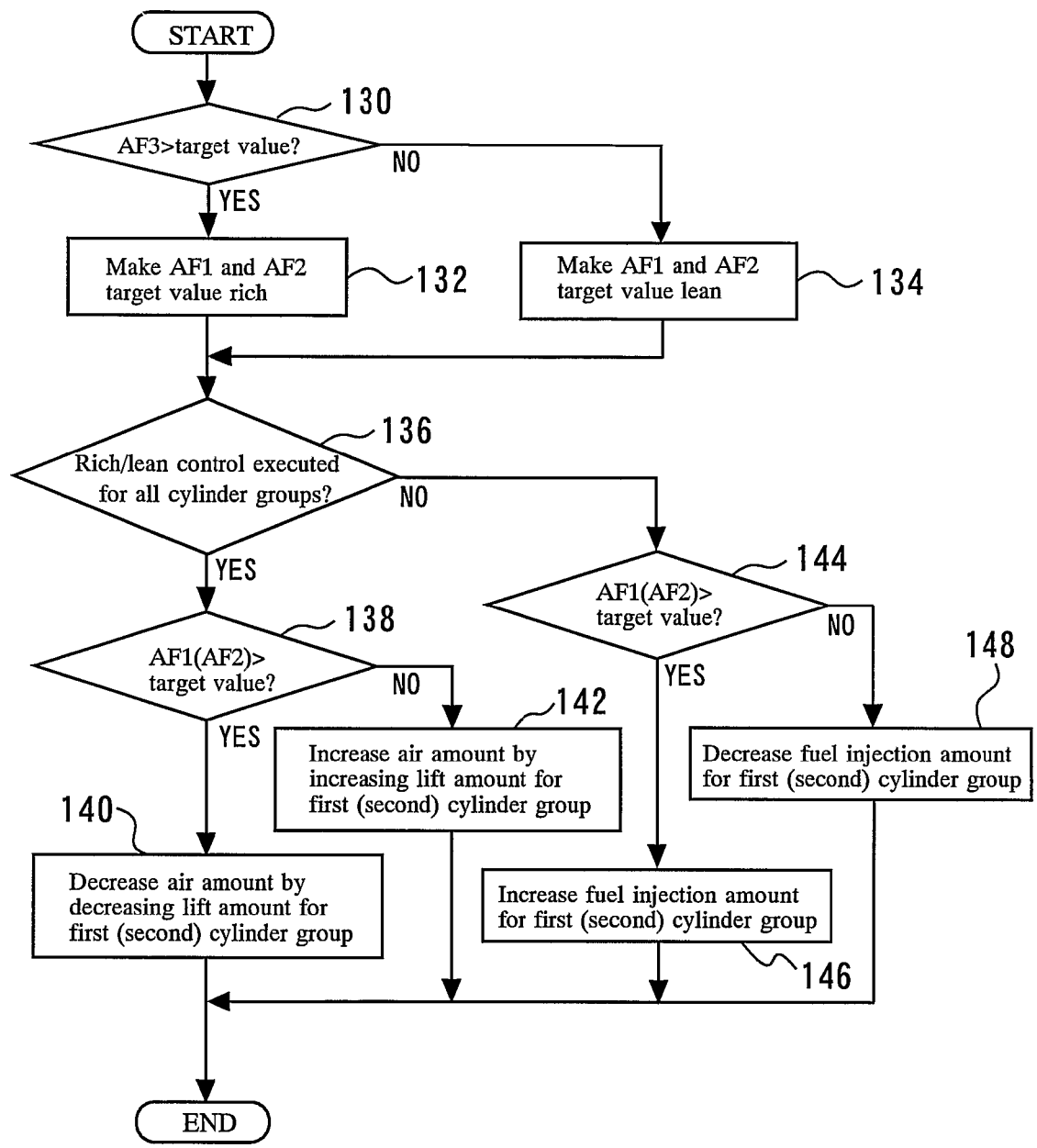
FIG. 6 is a flowchart illustrating a routine that the ECU 60 executes in accordance with the third embodiment.

The system according to a third embodiment of the present invention can be implemented by adopting the hardware configuration shown in FIGS. 1 and 2 and allowing the ECU 60 to execute a routine that is shown in FIG. 6 and will be described later.

Features of the Third Embodiment

The first and second embodiments correct the fuel injection amount with the air-fuel ratio learning value to prevent the variations of the air flow meter 40 and fuel injection valve 26 from affecting the exhaust air-fuel ratio. However, the dimensional variations the variable valve mechanism 24 may affect the exhaust air-fuel ratio.

If the exhaust air-fuel ratio detected by the air-fuel ratio sensor 58 differs from the theoretical air-fuel ratio, which is the target value, therefore, the third embodiment drives the variable valve mechanism 24 to additionally change the lift amount of the intake valve 22 for the purpose of equalizing the exhaust air-fuel ratio with the theoretical air-fuel ratio. More specifically, if the exhaust air-fuel ratio prevailing downstream of the NOx catalyst is rich, the variable valve mechanism 24 is driven to shift the air-fuel ratios of the first and second cylinder groups 2a, 2b toward the lean side. On the contrary, if the exhaust air-fuel ratio prevailing downstream of the NOx catalyst is lean, the variable valve mechanism 24 is driven to shift the air-fuel ratios of the first and second cylinder groups 2a, 2b toward the rich side. Therefore, even if the exhaust air-fuel ratio prevailing downstream of the NOx catalyst differs from the theoretical air-fuel ratio, the exhaust air-fuel ratio can be accurately controlled by changing the intake air amount with the variable valve mechanism 24 and not by changing the fuel injection amount.

Details of the Process Performed by the Third Embodiment

FIG. 6 is a flowchart illustrating a routine that the ECU 60 executes in accordance with the third embodiment.

In the routine shown in FIG. 6, step 130 is performed to judge whether the exhaust air-fuel ratio detected by the air-fuel ratio sensor 58 (hereinafter referred to as the "air-fuel ratio") AF3 is greater than a target value. As mentioned earlier, the target value for the air-fuel ratio AF3 coincides with the theoretical air-fuel ratio (14.6) in order to restrain the exhaust amount of unburned HC, $CO_2$, and other emission.

If the judgment result obtained in step 130 indicates that the air-fuel ratio AF3 is greater than the target value, that is, the exhaust air-fuel ratio prevailing downstream of the NOx catalyst is lean, the target value for the air-fuel ratio AF1 prevailing at the position of the exhaust sensor 52a and the target value for the air-fuel ratio AF2 prevailing at the position of the exhaust sensor 52b are shifted toward the rich side (step 132). In step 132, the ECU 60 calculates the deviation between the air-fuel ratio AF3 and target value. A map stored in the ECU 60 is then referenced to calculate the target value change amounts for the air-fuel ratios AF1, AF2 in accordance with the calculated deviation. The target values for the air-fuel ratios AF1, AF2 are then changed by the calculated change amounts (this also holds true for step 134, which will be described later).

In addition to the currently described routine, the ECU 60 performs another routine, for instance, the routine shown in FIG. 4 or 5, to calculate the intake air amount and fuel injection amount for each cylinder. Therefore, the target air-fuel ratio is determined from the calculated values. Further, the ECU 60 can calculate the target air-fuel ratio from the engine speed NE and engine load KL. The ECU 60 can use the target air-fuel ratio, which is calculated by either of the above methods, as the target values for the air-fuel ratios AF1, AF2 in step 132 (this also holds true for step 134, which will be described later).

If, on the other hand, the judgment result obtained in step 130 indicates that the air-fuel ratio AF3 is smaller than the target value, that is, the exhaust air-fuel ratio prevailing downstream of the NOx catalyst is rich, the target value for the air-fuel ratio AF1 prevailing at the position of the exhaust sensor 52a and the target value for the air-fuel ratio AF2 prevailing at the position of the exhaust sensor 52b are shifted toward the lean side (step 134).

After the target values for the air-fuel ratios AF1, AF2 are changed in step 132 or 134, step 136 is performed to judge whether rich/lean control is executed for all cylinder groups. If the judgment result obtained in step 136 indicates that rich/lean control is executed for all cylinder groups, step 138 is performed to judge whether the air-fuel ratio AF1 detected by the exhaust sensor 52a is greater than the target value.

If the judgment result obtained in step 138 indicates that the air-fuel ratio AF1 is greater than the target value, the air-fuel ratio AF1 needs to be shifted toward the rich side. In this instance, the intake air amounts for the cylinders 2 belonging to the first cylinder group 2a are decreased by referencing a map stored in the ECU 60 and decreasing the lift amounts for the cylinders 2 (step 140). The map is formulated so that the lift amount decreases with an increase in the deviation between the air-fuel ratio AF1 and target value. This map makes it possible to decrease the intake air amounts for the cylinders and greatly shift the air-fuel ratio AF1 toward the rich side when the deviation between the air-fuel ratio AF1 and target value increases.

If, on the other hand, the judgment result obtained in step 138 indicates that the air-fuel ratio AF1 is smaller than the target value, the air-fuel ratio AF1 needs to be shifted toward the lean side. In this instance, the intake air amounts for the cylinders 2 belonging to the first cylinder group 2a are increased by referencing a map stored in the ECU 60 and increasing the lift amounts for the cylinders 2 (step 142). The map is formulated so that the lift amount increases with an increase in the deviation between the air-fuel ratio AF1 and target value. This map makes it possible to increase the intake air amounts for the cylinders and greatly shift the air-fuel ratio AF1 toward the lean side when the deviation between the air-fuel ratio AF1 and target value increases.

Further, the process performed in steps 138 to 142 is also performed for the second cylinder group 2b. More specifically, the lift amounts for the cylinders 2 belonging to the second cylinder group 2b are changed to change the intake air amount and shift the air-fuel ratio AF2 toward the rich side or lean side.

If the judgment result obtained in step 136 does not indicate that rich/lean control is executed for all cylinder groups, that is, if a normal stoichiometric burn process is to be performed, feedback control is executed as described below. In this instance, the fuel injection amount is controlled as usual so that the air-fuel ratio AF3 coincides with the theoretical air-fuel ratio. More specifically, step 144 is performed subsequently to query step 136 to judge whether the air-fuel ratio AF1 detected by the exhaust sensor 52a is greater than the target value.

If the judgment result obtained in step 144 indicates that the air-fuel ratio AF1 is greater than the target value, the fuel injection amounts for the cylinders 2 belonging to the first cylinder group 2a are increased to shift the air-fuel ratio AF1 toward the rich side (step 146). If, on the other hand, the judgment result obtained in step 144 indicates that the air-fuel ratio AF1 is smaller than the target value, the fuel injection amounts for the cylinders 2 belonging to the first cylinder group 2a are decreased to shift the air-fuel ratio AF1 toward the lean side (step 148).

Further, the process performed in steps 144 to 148 is also performed for the second cylinder group 2b. More specifically, the fuel injection amounts for the cylinders 2 belonging to the second cylinder group 2b are changed to shift the air-fuel ratio AF2 toward the rich side or lean side.

When the routine described above is started anew at the time of sulfur poisoning recovery of the NOx catalyst 56, the lift amount of the intake valve 22 is changed again by the variable valve mechanism 24 in step 140 or 142, and control is executed so that the air-fuel ratio AF3 agrees with the target value.

To converge the air-fuel ratio AF3 to the target value, the routine shown in FIG. 6 changes the lift amounts for the cylinders of the first and second cylinder groups 2a, 2b to change the intake air amounts for the cylinders, as described above. Since the fuel injection amount is not changed in such an instance, the air-fuel ratio learning value can be used as is the case with the first and second embodiments. Therefore, the air-fuel ratio AF3 can be accurately be converged to the target value even when the air-fuel ratio AF3 deviates from the target value due to the dimensional variations of the variable valve mechanism 24.

In the third embodiment, the air-fuel ratio sensor 58 for detecting the air-fuel ratio AF3 is positioned downstream of the NOx catalyst 56. However, the air-fuel ratio sensor may be placed in any position as far as it is positioned downstream of the confluence 50c of the first exhaust path 50a and second exhaust path 50b. Further, an object of the third embodiment can be achieved if the air-fuel ratio prevailing downstream of the confluence 50c is acquired. Therefore, a calculated value may be read as the air-fuel ratio without having to detect the air-fuel ratio with the sensor.

When the throttle valve installed in the intake path for each cylinder is used instead of the variable valve mechanism 24 to change the intake air amount for each cylinder, the exhaust air-fuel ratio may be affected by the dimensional variations or drive control variations of the throttle valve. In such an instance, too, the same advantages can be provided as is the case with the third embodiment when the opening of the throttle valve is changed again.

In the third embodiment, the "exhaust air-fuel ratio control means" according to the fourth or fifth aspect of the present invention is implemented when the ECU 60 performs steps 140 and 142.

The invention claimed is:

1. An air-fuel ratio control apparatus for an internal combustion engine that is capable of performing a rich burn process or a lean burn process for each cylinder group, the air-fuel ratio control apparatus comprising:
   a first exhaust path connected to a first cylinder group;
   a second exhaust path connected to a second cylinder group;
   a NOx catalyst positioned downstream of a confluence of the first exhaust path and the second exhaust path;
   a fuel injection valve for injecting fuel into each of cylinders of the first and second cylinder groups;

an intake air amount adjustment mechanism for changing an intake air amount for each of the cylinders;

poisoning recovery means for performing sulfur poisoning recovery of the NOx catalyst by causing the first cylinder group to perform a rich burn or lean burn process and causing the second cylinder group to perform a lean burn or rich burn process; and exhaust air-fuel ratio control means for changing the intake air amount for each cylinder by operating the intake air amount adjustment mechanism at the time of performing the sulfur poisoning recovery while providing substantially the same fuel injection amount for all cylinders of the first and second cylinder groups.

2. The air-fuel ratio control apparatus according to claim 1, further comprising:

ignition timing control means, when the sulfur poisoning recovery is performed, which gives ignition timing for optimizing torque and fuel consumption to a cylinder group that performs a rich burn process, and which gives ignition timing that is retarded from the ignition timing for optimizing torque and fuel consumption to a cylinder group that performs a lean burn process.

3. The air-fuel ratio control apparatus according to claim 1, further comprising:

exhaust air-fuel ratio acquisition means for acquiring an exhaust air-fuel ratio that prevails downstream of the confluence of the first exhaust path and the second exhaust path, wherein, if the exhaust air-fuel ratio acquired by the exhaust air-fuel ratio acquisition means does not agree with a theoretical air-fuel ratio when the sulfur poisoning recovery is performed, the exhaust air-fuel ratio control means additionally changes the intake air amount for each cylinder.

4. The air-fuel ratio control apparatus according to claim 1, further comprising:

an exhaust sensor positioned downstream of the NOx catalyst and for detecting an exhaust air-fuel ratio, wherein, if the exhaust air-fuel ratio detected by the exhaust sensor does not agree with a theoretical air-fuel ratio when the sulfur poisoning recovery is performed, the exhaust air-fuel ratio control means additionally changes the intake air amount for each cylinder.

5. An air-fuel ratio control apparatus for an internal combustion engine that is capable of performing a rich burn process or a lean burn process for each cylinder group, the air-fuel ratio control apparatus comprising:

a first exhaust path connected to a first cylinder group;

a second exhaust path connected to a second cylinder group;

a NOx catalyst positioned downstream of a confluence of the first exhaust path and the second exhaust path;

a fuel injection valve for injecting fuel into each of cylinders of the first and second cylinder groups;

a variable valve mechanism that changes the intake air amount for each of the cylinders by changing a valve opening characteristic of an intake valve possessed by each of the cylinders;

poisoning recovery means for performing sulfur poisoning recovery of the NOx catalyst by causing the first cylinder group to perform a rich burn or lean burn process and causing the second cylinder group to perform a lean burn or rich burn process; and exhaust air-fuel ratio control means for changing the intake air amount for each cylinder by operating the variable valve mechanism at the time of performing the sulfur poisoning recovery while providing substantially the same fuel injection amount for all cylinders of the first and second cylinder groups.

6. The air-fuel ratio control apparatus according to claim 5, further comprising:

ignition timing control means, when the sulfur poisoning recovery is performed, which gives ignition timing for optimizing torque and fuel consumption to a cylinder group that performs a rich burn process, and which gives ignition timing that is retarded from the ignition timing for optimizing torque and fuel consumption to a cylinder group that performs a lean burn process.

7. The air-fuel ratio control apparatus according to claim 5, further comprising:

exhaust air-fuel ratio acquisition means for acquiring an exhaust air-fuel ratio that prevails downstream of the confluence of the first exhaust path and the second exhaust path, wherein, if the exhaust air-fuel ratio acquired by the exhaust air-fuel ratio acquisition means does not agree with a theoretical air-fuel ratio when the sulfur poisoning recovery is performed, the exhaust air-fuel ratio control means additionally changes the intake air amount for each cylinder.

8. The air-fuel ratio control apparatus according to claim 5, further comprising:

an exhaust sensor positioned downstream of the NOx catalyst and for detecting an exhaust air-fuel ratio, wherein, if the exhaust air-fuel ratio detected by the exhaust sensor does not agree with a theoretical air-fuel ratio when the sulfur poisoning recovery is performed, the exhaust air-fuel ratio control means additionally changes the intake air amount for each cylinder.

9. An air-fuel ratio control apparatus for an internal combustion engine that is capable of performing a rich burn process or a lean burn process for each cylinder group, the air-fuel ratio control apparatus comprising:

a first exhaust path connected to a first cylinder group;

a second exhaust path connected to a second cylinder group;

a NOx catalyst positioned downstream of a confluence of the first exhaust path and the second exhaust path;

a fuel injection valve for injecting fuel into each of cylinders of the first and second cylinder groups;

an intake air amount adjustment mechanism for changing an intake air amount for each of the cylinders;

a poisoning recovery unit for performing sulfur poisoning recovery of the NOx catalyst by causing the first cylinder group to perform a rich burn or lean burn process and causing the second cylinder group to perform a lean burn or rich burn process; and an exhaust air-fuel ratio control unit for changing the intake air amount for each cylinder by operating the intake air amount adjustment mechanism at the time of performing the sulfur poisoning recovery while providing substantially the same fuel injection amount for all cylinders of the first and second cylinder groups.

10. An air-fuel ratio control apparatus for an internal combustion engine that is capable of performing a rich burn process or a lean burn process for each cylinder group, the air-fuel ratio control apparatus comprising:

a first exhaust path connected to a first cylinder group;

a second exhaust path connected to a second cylinder group;

a NOx catalyst positioned downstream of a confluence of the first exhaust path and the second exhaust path;

a fuel injection valve for injecting fuel into each of cylinders of the first and second cylinder groups;

a variable valve mechanism that changes the intake air amount for each of the cylinders by changing a valve opening characteristic of an intake valve possessed by each of the cylinders;

a poisoning recovery unit for performing sulfur poisoning recovery of the NOx catalyst by causing the first cylinder group to perform a rich burn or lean burn process and causing the second cylinder group to perform a lean burn or rich burn process; and an exhaust air-fuel ratio control unit for changing the intake air amount for each cylinder by operating the variable valve mechanism at the time of performing the sulfur poisoning recovery while providing substantially the same fuel injection amount for all cylinders of the first and second cylinder groups.

* * * * *